United States Patent
Trethewey et al.

(10) Patent No.: US 7,213,057 B2
(45) Date of Patent: May 1, 2007

(54) METHOD FOR CONFIGURATION OF NOTEBOOK COMPUTER BASED ON LOCATION

(75) Inventors: James R. Trethewey, Hillsboro, OR (US); Manoj Agnihotri, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 405 days.

(21) Appl. No.: 10/816,392

(22) Filed: Mar. 31, 2004

(65) Prior Publication Data
US 2005/0221844 A1 Oct. 6, 2005

(51) Int. Cl.
G06F 15/16 (2006.01)

(52) U.S. Cl. ............... 709/218; 455/456.1; 455/552.1; 455/435.1

(58) Field of Classification Search ........ 709/217–219; 455/456.1, 552.1, 435.1; 342/357.01, 4
See application file for complete search history.

(56) References Cited

U.S. PATENT DOCUMENTS

| 6,845,400 B2 | 1/2005 | Macpherson et al. |
| 2001/0053999 A1 | 12/2001 | Feinberg |
| 2002/0155844 A1* | 10/2002 | Rankin et al. .............. 455/456 |
| 2003/0022673 A1* | 1/2003 | Bantz et al. ................ 455/456 |
| 2003/0060211 A1 | 3/2003 | Chern et al. |
| 2004/0102197 A1 | 5/2004 | Dietz |
| 2004/0110530 A1* | 6/2004 | Alone et al. ............. 455/552.1 |
| 2004/0203768 A1* | 10/2004 | Ylitalo et al. ............ 455/435.1 |
| 2004/0203900 A1 | 10/2004 | Cedervall et al. |
| 2005/0060575 A1 | 3/2005 | Trethewey et al. |
| 2005/0131715 A1 | 6/2005 | Trethewey et al. |

* cited by examiner

Primary Examiner—Jeffrey Pwu
(74) Attorney, Agent, or Firm—Joni D. Stutman-Horn (57) ABSTRACT

A method for configuring a mobile computer based on location. The method including determining a change in location of the mobile computer, scoring a current location signature for the mobile computer against previously stored location profiles having location signatures to obtain a highest scoring location profile, and determining whether the highest scoring location profile exceeds a threshold. If the highest scoring location profile exceeds the threshold, then the computer settings for the highest scoring location profile are activated on the mobile computer. If the highest scoring location profile does not exceed the threshold, a new location profile is generated and stored for the current location signature. The new location profile is then activated on the mobile computer.

27 Claims, 6 Drawing Sheets

METHOD FOR CONFIGURATION OF NOTEBOOK COMPUTER BASED ON LOCATION

FIELD OF THE INVENTION

The present invention is generally related to the field of location based computing. More particularly, the present invention is related to a method for configuring a notebook computer based on location.

DESCRIPTION

Marketing research has shown that employees, characterized as being office or road warriors, are business people who move around a lot due to the daily responsibilities of their jobs. Such business people may move from conference room to conference room attending meetings. In other instances, their job responsibilities may require frequent travel. They may also telecommute one or more days per week.

Difficulties arise when the office or road warrior moves from one location to another and tries to log on to their corporate network, a network offered by the hotel in which they are staying, a wireless LAN (local area network), or some other network via their notebook computer. Often times the settings they need to allow such a connection are different than the settings that were initially installed in a profile on their notebook computer. For example, proxy settings to connect to the Internet may be different at home than they are in the office. Printer IP (Internet Protocol) addresses used to access a particular printer are different for each printer. Therefore, a printer located in or nearby a conference room has a different IP address than a printer located near the person's office or at the person's home. In such instances, office warriors must reconfigure their notebook computer profile settings by hand when they change their location in order to enable the notebook computer to connect to the network, utilize current peripherals, etc. in the new location.

Thus, what is needed are location-based profiles in which multiple profiles are defined, wherein each profile is associated with a location signature. What is also needed is a method for enabling a notebook computer, having the ability to determine its own location, to automatically identify the correct location signature, select the associated profile, and configure itself properly.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to a method for configuring a notebook computer based on location. This is accomplished by defining multiple profiles, wherein each profile is associated with a location signature. When a notebook computer, having multiple location signatures and profiles stored in a database, roams between different locations, the notebook computer automatically identifies the correct location signature, selects the associated profile, and configures itself properly. Although embodiments of the present invention are described with respect to notebook computers, other mobile computing devices may also be used.

Figure 1A:
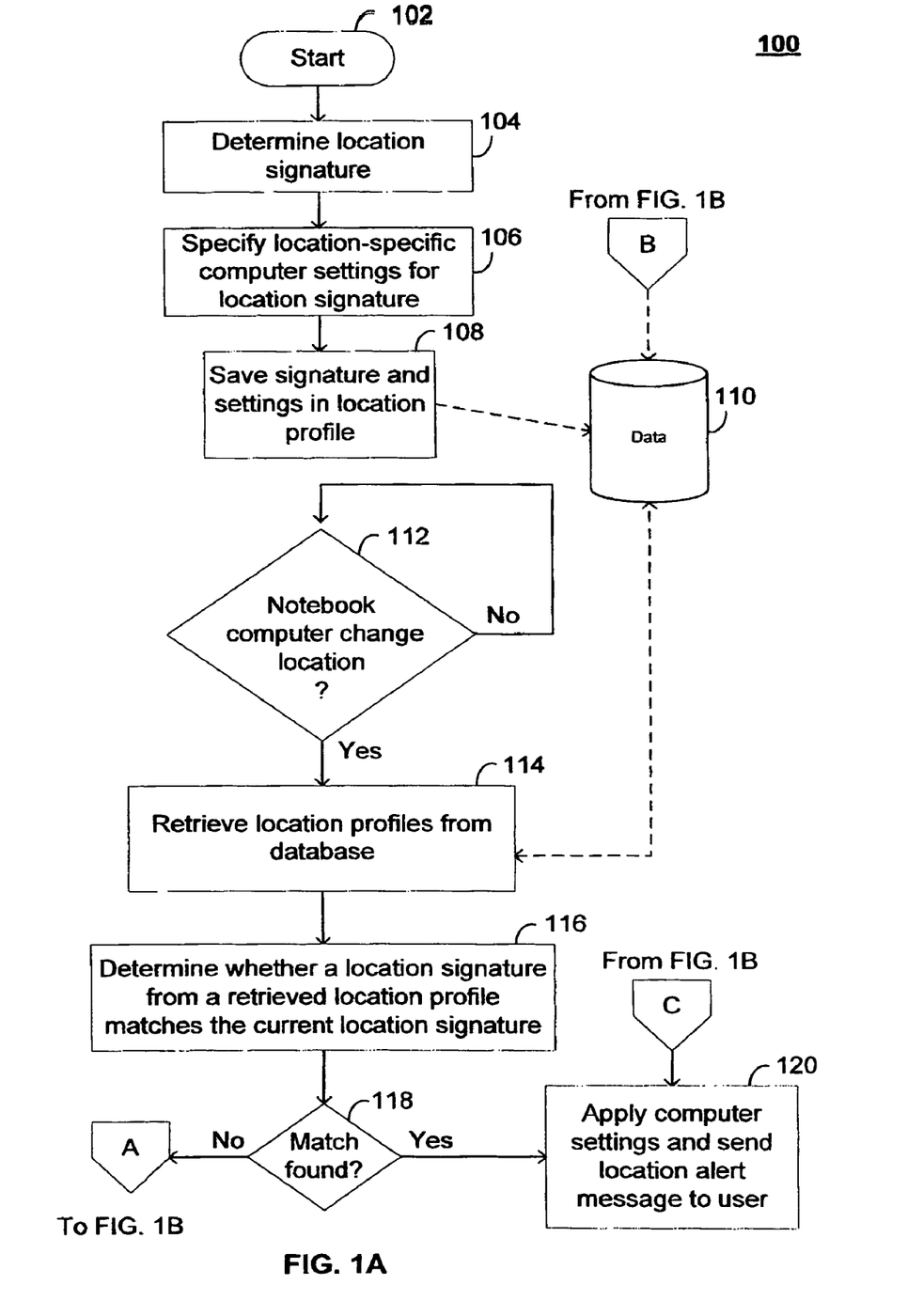
FIG. 1 is a flow diagram describing an exemplary method for configuring a notebook (or laptop) computer based on location according to an embodiment of the present invention.

FIG. 1 is a flow diagram 100 describing an exemplary method for configuring a notebook (or laptop) computer based on location according to an embodiment of the present invention. The invention is not limited to the embodiment described herein with respect to flow diagram 100. Rather, it will be apparent to persons skilled in the relevant art(s) after reading the teachings provided herein that other functional flow diagrams are within the scope of the invention. The process begins with block 102, where the process immediately proceeds to block 104.

In block 104, a location signature is determined. In embodiments where a notebook computer (e.g., laptop) has the ability to determine its own location using radiobased location determination technologies, such as, for example, a WLAN (Wireless Local-Area-Network), a wireless LAN interface scans for radio waves of nearby access points (APs). In this instance, the location signature may be defined as a set of WLAN APs audible around a specific location. The specific location may be a site, a building, a floor of a building, a room of a building, an area within a room of a building, etc. The captured characteristics of each detectable access point (AP) are grouped together as a location signature. The captured characteristics may include, but are not limited to, the identification (ID) of the access point and the signal strength of the access point for a particular location.

In block 106, location specific computer settings for the location signature are determined. In one embodiment, dialog boxes are used as pop-up graphical user interfaces to enable a user to enter specific computer settings for the location signature.

Figure 2:
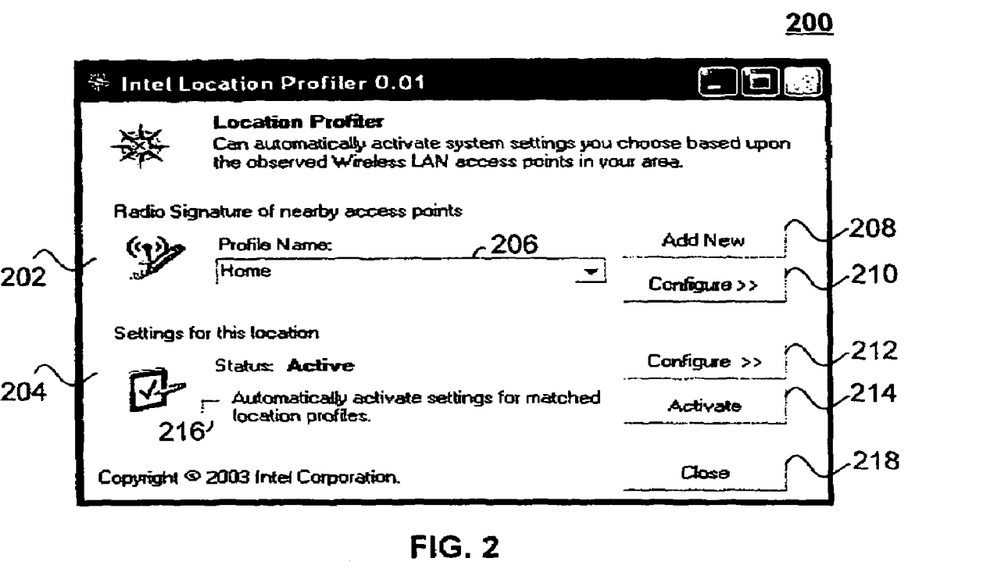
FIG. 2 is a diagram illustrating an exemplary main dialog window for a location profile according to an embodiment of the present invention.

An exemplary main dialog window for a location profiler is shown in FIG. 2. Location profiler 200 is used to enable automatic activation of system settings based upon observed WLAN access points for a specific location.

Location profiler 200 comprises a radio signature section 202 and a settings section 204. Radio signature section 202 comprises a Profile Name select box 206, an "Add New" button 208, and a Configure button 210. Profile Name select box 206 allows a user to manually select a previously defined location profile. If no profiles have been defined, a default location profile is provided. Add New button 208 may be used to assign a name to a new location profile. Configure button 210 may be used to bring up a radio signature dialog window 300 to enable radio signatures to be captured by the user. Radio signature dialog window 300 is described below with reference to FIG. 3.

Settings section 204 comprises a Configure button 212, an Activate button 214, an Automatic activate check box 216, and a Close button 218. Configure button 212 may be used to define all of the settings that apply to a location profile. Activate button 214 allows manual activation of the settings for a location profile. Activate check box 216 allows for the immediate application of the selected settings for a location profile when the profile has been selected. This may occur manually when the user chooses a profile from profile name select box 206 or when a profile is automatically chosen based on the location of the user. Close button 218 terminates the program. When a user wants to continuously scan, the user may minimize location profiler window 200.

Figure 3:
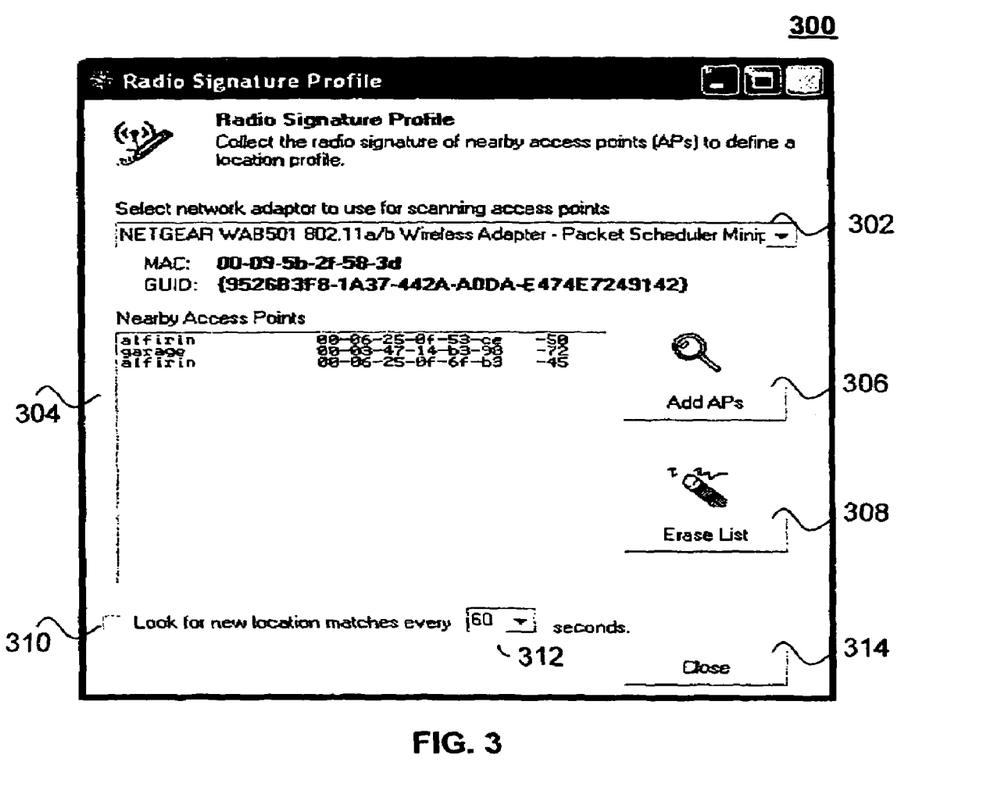
FIG. 3 is a diagram illustrating an exemplary radio signature dialog window according to an embodiment of the present invention.

Radio signature dialog window 300 is shown in FIG. 3. Radio signature dialog window 300 comprises the radio signatures of nearby access points used to define a location profile. Radio signature dialog window 300 includes a Select network adaptor select box 302, a Nearby Access Points list 304, an Add APs button 306, an Erase List button 308, a Look for new location matches check-box 310, and a Close button 314.

Select network adaptor select box 302 allows the user to choose from available NICs (Network Interface Cards) present on the system. As each NIC (Network Interface Card) is selected, identifying characteristics about the NIC are displayed (as shown below Select network adaptor select box 302). Radio signatures are collected using a WLAN network interface card (NIC). In a computer where more than one WLAN NIC is installed, the user may select which NIC is going to be used for scanning.

Add APs button 306 causes the WLAN NIC to scan the surrounding area for the presence of APs. Any APs that are found will be shown in Nearby Access Points list 304. When a user clicks button 306 more than once, additional readings will be taken and added to list 304. This feature may be useful when a user is defining a single location profile for a long building, where a different collection of APs may be audible at the opposite end of the long building. Erase List button 308 clears Nearby Access Points list 304.

Look for new location matches check-box 310 allows for periodic scans of APs using a chosen interval of seconds (shown in selection box 312). If Look for new location matches check-box 310 is checked, automatic scanning will occur. With each scan, the application will compare and score each stored location profile and select a best match. Location matching is described below with reference to FIGS. 5 and 6. To disable automatic scanning and best-match profile selection, check-box 310 must be disabled (i.e., unchecked). Close button 314 allows one to close radio signature dialog window 300.

Figure 4:
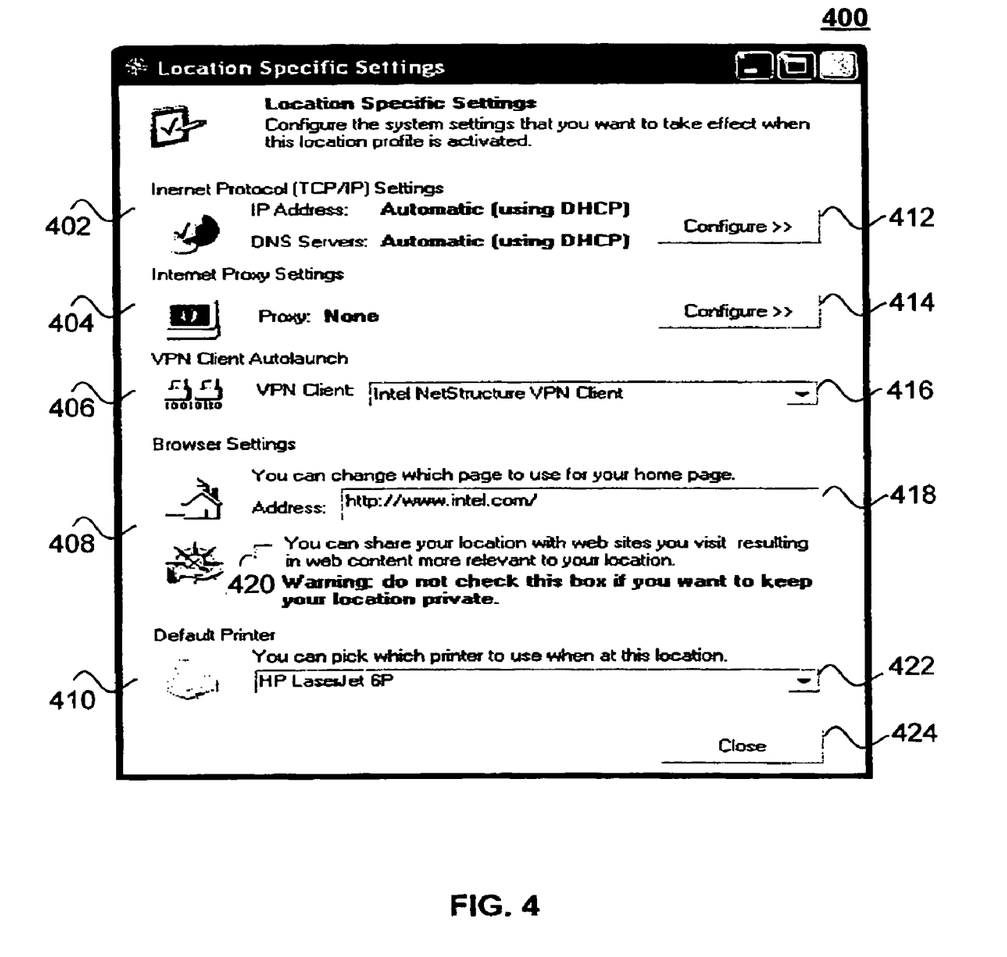
FIG. 4 is a diagram illustrating an exemplary location specific settings dialog window according to an embodiment of the present invention.

A settings dialog window 400 is shown in FIG. 4. Settings dialog window 400 comprises the system settings to configure when a location profile is activated. Settings dialog window 400 includes, but is not limited to, IP (Internet Protocol) Settings 402, Internet Proxy Settings 404, VPN (Virtual Private Network) Client Autolaunch 406, Browser Settings 408, and Default Printer 410. Although embodiments of the present invention are described with the above settings, other settings may also be used. Such settings include, but are not limited to, time and time zone, login authentication credentials, etc.

IP Settings 402 comprises details of the currently defined IP address and DNS (Domain Name Service) server address (es). IP Settings 402 includes a Configure button 412. Configure button 412 opens an IP Settings dialog so that a user can enter parameters manually. The parameters include IP address, IP subnet mask, gateway, preferred DNS server, and alternate DNS server. Although manual settings may be entered, the user may choose to apply automatic address assignment via DHCP (Dynamic Host Configuration Protocol). DHCP is well known to those skilled in the relevant art(s).

Internet Proxy Settings 404 comprises details of the currently defined proxy. Internet Proxy Settings 404 also includes a Configure button 414 for opening a Proxy Settings dialog to enable a user to enter parameters manually. Such parameters may include an address to enable use of an automatic configuration script, address and port for use of a proxy server for the user's LAN, a check-box for bypassing the proxy server for local addresses, advanced settings for defining different proxy servers for different protocols, and exceptions for domains that do not require proxy.

VPN Client Autolaunch 406 comprises a select box 416 to enable a user to select one of the VPN clients to launch. The select box may contain VPN clients that are detected on the system.

Browser Settings 408 comprise a home page text box 418 and a share your location check-box 420. Home page text box 418 allows a user to enter the browser home page the user would like to be activated when a particular location profile is activated. For example, while at work the user may want the organization's intranet home page to be displayed, and while at home the user may prefer a different home page, such as, for example, http://www=google=com (It should be noted that periods have been replaced with equal signs in URLs within this document to avoid inadvertent hyperlinks.). Share your location check-box 420 allows a user to share its location with web sites the user visits to enable web content to be tailored or more relevant to the user's location. When check-box 420 is checked, the name of the currently selected location profile and the Universal Location Framework (ULF) determined location fix (latitude, longitude, and altitude) are reported in the HTTP header of requests sent to web sites. Web server applications may extract this information to tailor their display to provide information that is more relevant to the user's location. If the user desires not to provide their location and keep it private, check-box 420 is left unchecked.

Default printer 410 comprises a select box 422 to enable the user to select one of the system printers to set as the default printer when a particular location profile is activated. In one embodiment, the printers listed are those already installed on the system. Thus, the user must pre-install any printers of interest at locations visited, including any necessary device drivers. In another embodiment, UPnP (universal plug and play) protocols or other techniques may be used to automatically discover and configure printers at new locations.

Also included in Settings dialog window 400 is a close button 424. Close button 424 may be used to close Settings dialog window 400.

Returning back to FIG. 1, block 106, the user may enter new profile data into the dialog boxes described above. When no profile exists for a location in the system, the pop-up dialogs may automatically be displayed to the user to enable the user to input profile data for the new location.

In one embodiment, an Information Technology (IT) Department may set up profiles to be used in various locations, on or off the campus grounds of the employer, and make the profiles available on a server. When a user logs onto the server, the server may indicate that new profiles are available. In one embodiment, the user may select which profiles the user desires to have on the notebook computer and request that the selected profiles be downloaded. In another embodiment, the server may automatically download the new profiles to the user's notebook computer. The user may then roam the campus of the employer without having to develop or modify new profiles while roaming the campus.

As previously indicated, the user may have the network, via DHCP, configure the profile prior to the dialog boxes appearing. In this instance, the user may decide to keep the profile as populated by DHCP or the user may change some of the parameters to fit the user's needs.

In block 108, the location signature and profile settings are stored as a location profile in a database, such as database 110. In one embodiment, the location profiles may be stored in an encoded format called XML. In one embodiment, when a user saves a location profile, the location profile may be automatically translated into XML and stored on the hard disk.

In decision block 112, it is determined whether the notebook computer has changed locations. If the notebook computer has not changed locations, the process remains at decision block 112. If the notebook computer has changed locations, the process proceeds to block 114.

In block 114, all location profiles are retrieved from database 110. In block 116, each location signature from each location profile is compared with the current location signature of the notebook computer to determine whether there is a match between a location signature stored in a location profile and the current location signature. In one embodiment, a location matching algorithm may be used to determine whether the current location matches the location signature stored in the location profile. The location matching algorithm is described below with reference to FIGS. 5 and 6. The process then proceeds to decision block 118.

In decision block 118, it is determined whether a match to the current location signature has been found. If it is determined that a match has been found, the process proceeds to block 120.

In block 120, the location profile settings from the matching location profile are applied to the notebook computer and a location alert message is sent to the user. In one embodiment, the location alert message may be in the form of a pop-up dialog box to indicate to the user that the current location is within sufficient proximity to a previously saved location profile. In another embodiment, the location alert message may be sent to the user via email, a network packet, or some other means for informing the user that a previously saved location profile has been applied.

Figure 1B:
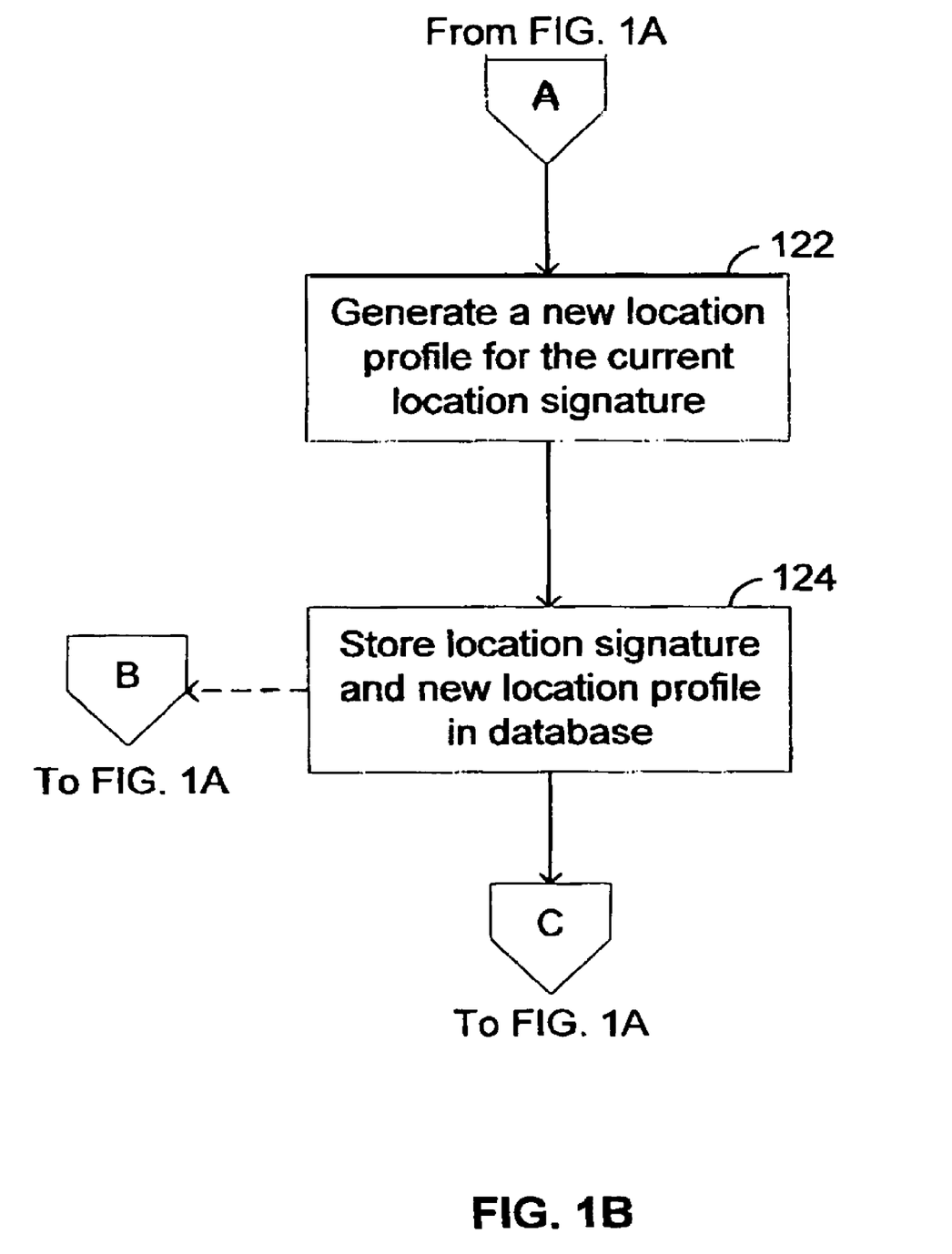

Returning to decision block 118, if it is determined that a match has not been found, then the process proceeds to block 122 in FIG. 1B. In block 122, a new location profile is generated in a similar manner as described with reference to block 106 in FIG. 1A. In one embodiment, a default location profile may be activated for the current location signature. DHCP may be used to define the default location profile. In one embodiment, profile pop-up windows displaying the default values for the default location profile may be launched to enable the user to modify the default location profile to fit the user's needs. The process then proceeds to block 124.

In block 124, the location signature and new location profile are saved in database 110. The process then proceeds to block 120 in FIG. 1A, where the settings are applied to the notebook computer and the user is sent an alert message to inform the user that the current location is within sufficient proximity to the new location profile that was just defined.

Figure 5:
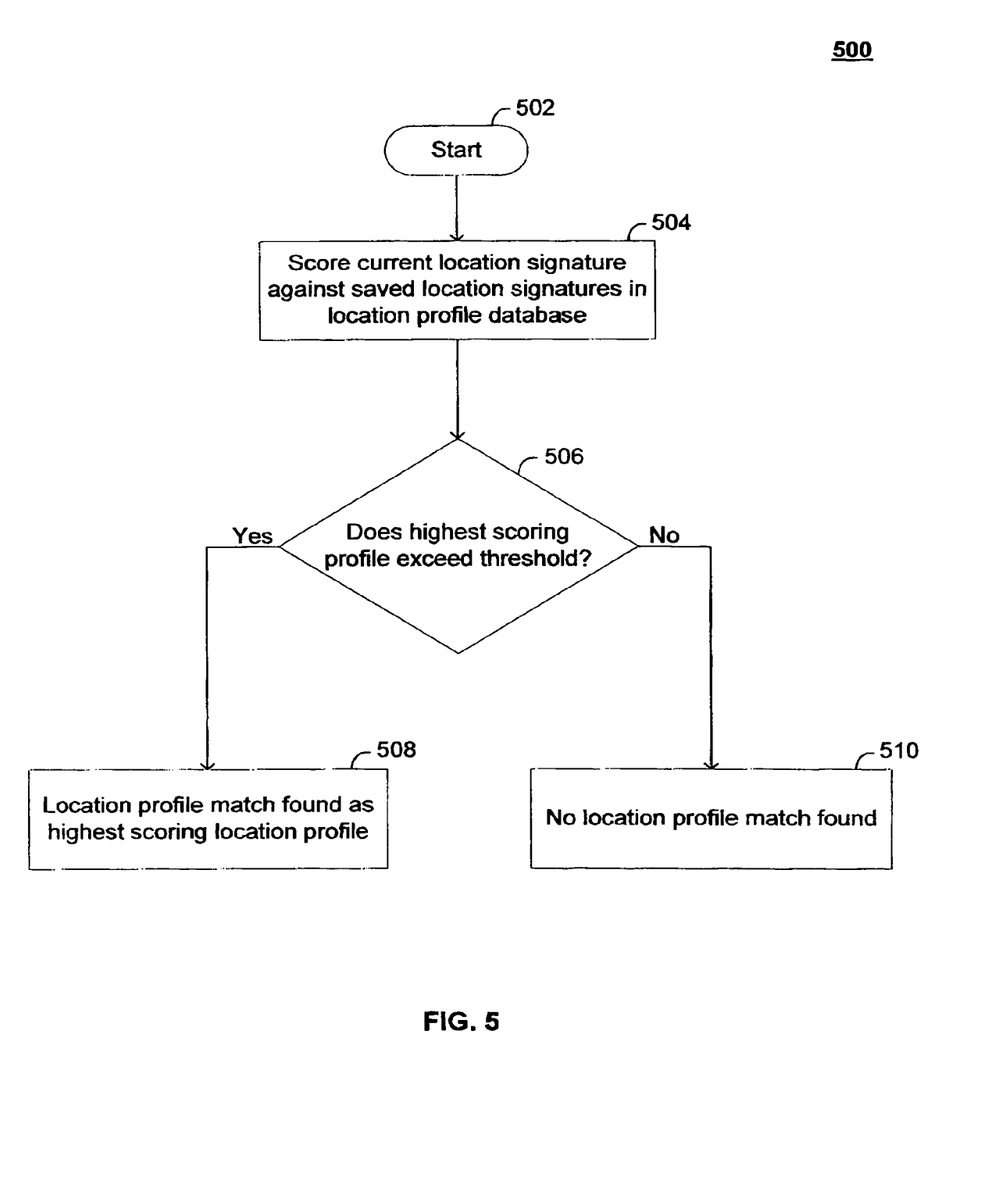
FIG. 5 is a flow diagram describing an exemplary method for location matching according to an embodiment of the present invention.

FIG. 5 is an exemplary flow diagram 500 describing an exemplary method for location matching according to an embodiment of the present invention. The invention is not limited to the embodiment described herein with respect to flow diagram 500. Rather, it will be apparent to persons skilled in the relevant art(s) after reading the teachings provided herein that other functional flow diagrams are within the scope of the invention. The process begins with block 502, where the process immediately proceeds to block 504.

Figure 6:
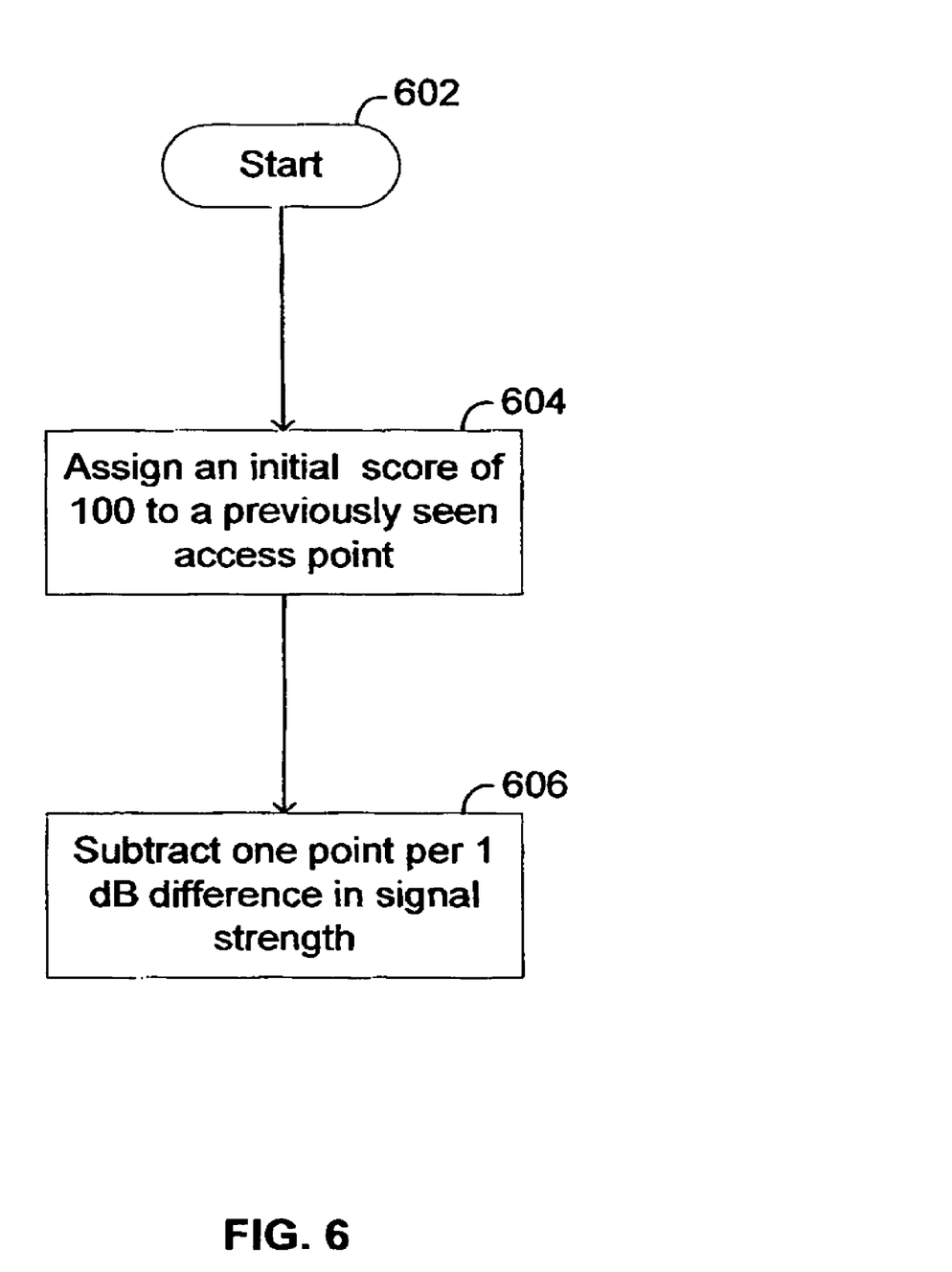
FIG. 6 is a flow diagram describing an exemplary method for scoring location signatures found in location profiles according to an embodiment of the present invention.

In block 504, the current location signature is scored against saved location signatures in the location profile database. FIG. 6 is a flow diagram 600 describing an exemplary method for scoring location signatures according to an embodiment of the present invention. The invention is not limited to the embodiment described herein with respect to flow diagram 600. Rather, it will be apparent to persons skilled in the relevant art(s) after reading the teachings provided herein that other functional flow diagrams are within the scope of the invention. The process begins with block 602, where the process immediately proceeds to block 604.

In block 604, an initial score of 100 is assigned for each access point (AP) that was seen previously. The absolute value of one (1) point per 1 dB difference in signal strength for the AP is subtracted from the initial score to obtain a final score for the stored location profile. For example, if a location profile was previously stored with only one AP having a measured signal strength of −32 db, and at a later time the same AP was seen, but with a lower signal strength of −54 dB, then the final score would now be 78 (i.e., (100−abs(−54−−32))).

Returning to FIG. 5, in an embodiment of the invention, a hysteresis threshold may be incorporated to provide a level of confidence in the selected match prior to switching location profiles. In one embodiment, the hysteresis threshold may be determined by the user. In another embodiment, a default value for the hysteresis threshold may be used.

In decision block 506, it is determined whether the highest scoring profile exceeds the threshold. If the highest scoring profile exceeds the threshold, then the process proceeds to block 508.

In block 508, the highest scoring location profile is designated as a match.

Returning to decision block 506, if it is determined that the highest scoring profile does not exceed the threshold, then a match has not been found. In this instance, none of the currently scanned APs are a match with any previous location profile.

While embodiments of the present invention have been described using the presence of access points and the signal strengths of the access points, other methods to determine the location signature and scoring may be used without departing from the spirit and scope of the present invention. For example, in one embodiment, the location of an access point, such as longitude, latitude, and altitude, may be stored inside an access point memory. When the notebook computer performs scans for access points, the access point may provide its location (i.e., longitude, latitude, and altitude). A triangulation may then be performed to determine the location of the notebook computer. Using the signal strength of the access point(s), an associated matching location profile may be found. In other embodiments, other sensor techniques may be utilized. For example, a GPS receiver installed in a notebook computer may be used to determine the location of the notebook computer using satellites. The satellites provide a location for the notebook computer in the form of a tuple (i.e., longitude, latitude, and altitude) which may be used to find a location profile in the database that has the closest longitude, latitude, and altitude. In another embodiment, cellular modems found in notebook computers may be used to communicate with cell phone towers. The cell phone towers may send information to the network interface card in the notebook computer. Such information may be used to triangulate the position of the notebook computer. Once the position of the notebook computer has been determined, the location profile stored on the notebook computer closest to the notebook computer's location may be found. In yet another embodiment, radio frequency (RF) identification (RFID) tags may be used that send out a serial number. The RFID tags may be placed on stationary items, such as walls, doors, servers, printers, and other stationary equipment to enable each item in an enterprise to broadcast a serial number. The serial numbers of the RFID tags may be read by an RFID reader installed in the notebook computer. A list of the stationary items along with the corresponding serial number and location of the item may be stored in a database on a corporate LAN to provide the notebook with its location. The location of the notebook may then be compared with the locations of the stored profiles to determine the closest profile match.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. An adaptable computer profile method comprising:
   determining a change in location of a mobile computer;
   scoring a current location signature against previously stored location profiles having location signatures to obtain a highest scoring location profile;
   determining whether the highest scoring location profile exceeds a threshold; and
   if the highest scoring location profile exceeds the threshold,
      activating computer settings for the highest scoring location profile on the mobile computer; and
      sending a location alert to a user of the mobile computer to indicate that a location specific profile has been activated.

2. The method of claim 1, wherein if the highest scoring location profile does not exceed the threshold, the method further comprising:

generating a new location profile for the current location signature;

storing the current location signature with the new location profile; and activating the new location profile on the mobile computer, wherein the new location profile includes computer settings specific to the location of the mobile computer.

3. The method of claim 2, further comprising sending a location alert to the user of the mobile computer to inform the user that the current location is within proximity to the new location profile.

4. The method of claim 1, wherein if the highest scoring location profile does not exceed the threshold, the method further comprising:

displaying a default location profile to the user;

enabling the user to modify the default location profile values when necessary; and activating the default location profile computer settings on the mobile computer, wherein if the default location profile computer settings are modified by the user, activating the modified default location profile computer settings.

5. The method of claim 4, wherein the default location profile is generated using a Dynamic Host Configuration Protocol.

6. The method of claim 1, wherein the previously stored location profiles comprise location specific computer settings and corresponding location signature, wherein the location specific computer settings comprise Internet Protocol settings. Internet Proxy settings, Virtual Private Network settings, Browser settings, default printer settings, time and time zone settings, and login credential settings.

7. The method of claim 1, wherein scoring the current location signature against the previously stored location profiles having location signatures comprises:

assigning an initial score of 100 to each previously seen access point; and subtracting the absolute value of one point per 1 dB difference in signal strength from the initial score.

8. The method of claim 1, wherein activating computer settings for the highest scoring location profile on the mobile computer comprises activating location specific computer settings for the highest scoring location profile.

9. The method of claim 1, wherein each of the location signatures comprises one or more access points audible around a specific location, wherein the specific location comprises one of a site, a building, a floor within a building, a room within a building; and an area within a room.

10. The method of claim 1, wherein the mobile computer includes a wireless local area network (LAN) network interface card (NIC) and wherein prior to determining a change in location of the mobile computer, the method comprises:

determining the location signatures;

specifying the location specific computer settings for each of the location signatures; and storing each of the location signatures with a corresponding location specific computer settings as the location profiles on the mobile computer.

11. The method of claim 10, wherein determining the location signatures comprises scanning a surrounding area for the presence of access points and characterizing the access points for the surrounding area.

12. The method of claim 11, wherein characterizing the access points includes access point identification information and access point signal strength information.

13. The method of claim 11, wherein determining characterizing the access points includes obtaining location information for each access point wherein each access point stores its location in a form of a tuple, wherein the tuple comprises longitude, latitude, and altitude information, and wherein scoring a current location signature against previously stored location profiles having location signatures comprises comparing the tuple for each of the previously stored location profile against the current location signature, determining which of the previously stored location profiles is closest to the current location signature, and selecting the closest previously stored location profile as the highest scoring location profile.

14. The method of claim 1, wherein the mobile computer includes a Global Positioning System (GPS), wherein the GPS communicates with satellites to provide location information to the mobile computer in a form of a tuples, wherein the tuple comprises longitude, latitude, and altitude information to describe the location of the mobile computer, and wherein scoring the current location signature against the previously stored location profiles having location signatures comprises comparing the tuples for each of the previously stored location profiles against the current location signature, determining which of the previously stored location profiles is closest to the current location signature, and selecting a previously stored location profile closest to the current location signature as the highest scoring location profile.

15. The method of claim 1, wherein the mobile computer includes a cellular modem, wherein the cellular modem communicates with a plurality of cell phone towers to obtain information, wherein the information is used to triangulate the location of the mobile computer, and wherein scoring the current location signature against the previously stored location profiles having location signatures comprises comparing the location for each of the previously stored location profiles against the location of the mobile computer, determining which of the previously stored location profiles is closest to the location of the mobile computer, and selecting the closest previously stored location profile as the highest scoring location profile.

16. The method of claim 1, wherein the mobile computer includes an RFID (Radio Frequency Identification) reader, wherein the RFID) reader scans a plurality of RFID tags placed on stationary equipment dispersed throughout an enterprise, wherein the RFID tags, when scanned, provide a serial number that is used to determine the location of the stationary equipment from a database stored on a corporate LAN, wherein the location of the stationary equipment is used to determine the location of the mobile computer, and wherein scoring the current location signature against the previously stored location profiles having location signatures comprises comparing the location for each of the previously stored location profiles against the location of the mobile computer, determining which of the previously stored location profiles is closest to the location of the mobile computer, and selecting a previously stored location profile that is closest to the location of the mobile computer as the highest scoring location profile.

17. An article comprising: a storage medium having a plurality of machine accessible instructions, wherein when the instructions are executed by a processor, the instructions provide for determining a change in location of a mobile computer;

scoring a current location signature against previously stored location profiles having location signatures to obtain a highest scoring location profile;

determining whether the highest scoring location profile exceeds a threshold; and if the highest scoring location profile exceeds the threshold,
- activating computer settings for the highest scoring location profile on the mobile computer; and
- sending a location alert to a user of the mobile, computer to indicate that a location specific profile has been activated.

18. The article of claim 17, wherein if the highest scoring location profile does not exceed the threshold, the instructions further providing for:
- generating a new location profile for the current location signature;
- storing the current location signature with the new location profile; and
- activating the new location profile on the mobile computer, wherein the new location profile includes computer settings specific to the location of the mobile computer.

19. The article of claim 18, further comprising instructions for sending a location alert to the user of the mobile computer to inform the user that the current location is within proximity to the new location profile.

20. The article of claim 17, wherein if the highest scoring location profile does not exceed the threshold, the instructions providing for:
- displaying a default location profile to the user;
- enabling the user to modify the default location profile values when necessary; and
- activating the default location profile computer settings on the mobile computer, wherein if the default location profile computer settings are modified by the user, activating the modified default location profile computer settings.

21. The article of claim 20, wherein the default location profile is generated using a Dynamic Host Configuration Protocol.

22. The article of claim 17, wherein the previously stored location profiles comprise location specific computer settings and corresponding location signature, wherein the location specific computer settings comprise Internet Protocol settings, Internet Proxy settings, Virtual Private Network settings, Browser settings, default printer settings, time and time zone settings, and login credential settings.

23. The article of claim 17, wherein instructions for scoring the current location signature against the previously stored location profiles having location signatures comprises instructions for:
- assigning an initial score of 100 to each previously seen access point; and subtracting the absolute value of one point per 1 dB difference in signal strength from the initial score.

24. The article of claim 17, wherein instructions for activating computer settings for the highest scoring location profile on the mobile computer comprises instructions for activating location specific computer settings for the highest scoring location profile.

25. The article claim 17, wherein each of the location signatures comprises one or more access points audible around a specific location, wherein the specific location comprises one of a site, a building, a floor within a building, a room within a building, and an area within a room.

26. The article of claim 17, wherein the mobile computer includes a wireless local area network (LAN) network interface card (NIC) and wherein prior to instructions for determining a change in location of the mobile computer, the instructions provide for:
- determining the location signatures;
- specifying the location specific computer settings for each of the location signatures; and
- storing each of the location signatures with their corresponding location specific computer settings as the location profiles on the mobile computer.

27. The article of claim 26, wherein instructions for determining the location signatures comprises instructions for scanning a surrounding area for the presence of access points and characterizing the access points for the surrounding area.

* * * * *